United States Patent
Kraus et al.

(10) Patent No.: US 9,453,147 B2
(45) Date of Patent: Sep. 27, 2016

(54) COLD CONTACT ADHESIVES

(71) Applicant: Bayer Intellectual Property GmbH, Monheim (DE)

(72) Inventors: Harald Kraus, Leverkusen (DE); Wolfgang Arndt, Dormagen (DE); Matthias Wintermantel, Hürth (DE)

(73) Assignee: Covestro Deutschland AG, Leverkusen (DE)

( * ) Notice: Subject to any disclaimer, the term of this patent is extended or adjusted under 35 U.S.C. 154(b) by 191 days.

(21) Appl. No.: 14/350,999

(22) PCT Filed: Oct. 11, 2012

(86) PCT No.: PCT/EP2012/070108
§ 371 (c)(1),
(2) Date: Apr. 10, 2014

(87) PCT Pub. No.: WO2013/053786
PCT Pub. Date: Apr. 18, 2013

(65) Prior Publication Data
US 2014/0249267 A1 Sep. 4, 2014

(30) Foreign Application Priority Data
Oct. 14, 2011 (EP) .................... 11185228

(51) Int. Cl.
*B32B 27/40* (2006.01)
*C08G 18/08* (2006.01)
*C08G 18/10* (2006.01)
*C08G 18/12* (2006.01)
*C08G 18/42* (2006.01)
*C09J 9/00* (2006.01)

(52) U.S. Cl.
CPC .................. *C09J 9/00* (2013.01); *B32B 27/40* (2013.01); *C08G 18/0823* (2013.01); *C08G 18/0828* (2013.01); *C08G 18/10* (2013.01); *C08G 18/12* (2013.01); *C08G 18/4202* (2013.01); *C08G 2170/80* (2013.01); *C08G 2170/90* (2013.01)

(58) Field of Classification Search
CPC .......... C08G 18/0823; C08G 18/0828; C08G 18/10; C08G 18/12; C08G 18/4202; C08G 2170/80; C08G 2170/90; C09J 9/00; B32B 27/40
See application file for complete search history.

(56) References Cited

U.S. PATENT DOCUMENTS

| | | |
|---|---|---|
| 3,491,050 A | 1/1970 | Keberle et al. |
| 3,522,199 A | 7/1970 | Keberle et al. |
| 4,433,095 A | 2/1984 | Hombach et al. |
| 4,663,377 A | 5/1987 | Hombach et al. |
| 4,870,129 A | 9/1989 | Henning et al. |
| 2004/0034162 A1 | 2/2004 | Laas et al. |
| 2007/0049684 A1 | 3/2007 | Rische et al. |
| 2011/0217502 A1 | 9/2011 | Kraus et al. |

FOREIGN PATENT DOCUMENTS

| | | |
|---|---|---|
| DE | 1570615 A1 | 7/1969 |
| DE | 1570602 A1 | 8/1969 |
| DE | 1694062 A1 | 6/1971 |
| DE | 3112117 A1 | 10/1982 |
| DE | 10024624 A1 | 11/2001 |
| DE | 102005040130 A1 | 3/2007 |
| EP | 0 206 059 A2 | 12/1986 |
| GB | 1128568 | 9/1968 |
| WO | WO-2005100427 A1 | 10/2005 |
| WO | WO-2009059696 A1 | 5/2009 |
| WO | WO-2010054761 A1 | 5/2010 |

OTHER PUBLICATIONS

International Search Report for PCT/EP2012/070108 dated Feb. 8, 2013.

*Primary Examiner* — Patrick Niland
(74) *Attorney, Agent, or Firm* — Drinker Biddle & Reath LLP

(57) ABSTRACT

An aqueous dispersion comprising at least one polyurethane polymer with a melting temperature in the range of 30° C. to 50° C. and (cold contact) adhesives comprising such a polyurethane dispersion, a method for creating an adhesive bonding and the use of such (cold contact) adhesives for creating an adhesive bonding.

16 Claims, No Drawings

COLD CONTACT ADHESIVES

RELATED APPLICATIONS

This application is a national stage application (under 35 U.S.C. §371) of PCT/EP2012/070108, filed Oct. 11, 2012, which claims benefit of European Application No. 11185228.1, filed Oct. 14, 2011, which is incorporated by reference herein.

The present invention relates to an aqueous polyurethane dispersion, cold contact adhesives comprising such a polyurethane dispersion, a method for creating an adhesive bonding and the use of such cold contact adhesives for creating an adhesive bonding.

Adhesives based on aqueous polyurethane dispersions have been established worldwide in demanding industrial applications, for example in the production of footwear, for joining parts in automobile interiors or textile substrates or in laminating films. The production of aqueous polyurethane or polyurethane-polyurea dispersions is also generally known in the art.

When using aqueous polyurethane or polyurethane-polyurea dispersions as adhesives a heat activation process is frequently employed. In this process the dispersion is applied to a substrate and after complete evaporation of the water the adhesive layer is activated by heat, for example using an infrared lamp. This transfers the adhesive into a sticky state. The temperature needed is usually designated as the activation temperature.

Adhesives based on aqueous polyurethane or polyurethane-polyurea dispersions suitable for the heat activation process are mentioned, by way of example, in U.S. Pat. No. 4,870,129. This patent concerns an adhesive consisting substantially of an aqueous solution or dispersion of a polyurethane containing chemically incorporated carboxylate and/or sulphonate groups. The polyurethane is prepared from a mixture of at least two (cyclo)-aliphatic diisocyanate and selected polyester diols based on (i) adipic acid and (ii) tetramethylenediol, hexamethylenediol or mixtures of these diols. The use of such aqueous solutions for the formation of bonds on any substrates, in particular on leather, plastics, rubber materials and/or polyvinyl chloride containing plasticizer, with the same material or with other materials is disclosed.

A disadvantage of such adhesives is that they cannot be used for joining articles at room temperature, thus being unsuited for many substrates.

WO 2010/054761 A1 discloses an aqueous polyurethane urea dispersion comprising a polyurethane urea polymer comprising structural units of the formula:

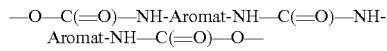
—O—C(=O)—NH-Aromat-NH—C(=O)—NH-Aromat-NH—C(=O)—O— wherein Aromat represents a compound selected from the group consisting of phenylene, tolylene, xylylene, tetramethylxylylene and diphenylenemethane, and wherein the polyurethane urea is obtained from components comprising A) at least one aromatic diisocyanate, B) at least one polyether polyol having a number-average molecular weight of from 300 g/mol to 1500 g/mol, C) at least one compound having one to two isocyanate-reactive groups and at least one ionogenic group, D) at least one polyol having a number-average molecular weight of from 60 g/mol to 499 g/mol, and E) water, wherein the average overall functionality of compounds B) to D) is from 1.85 to 2.2 and wherein the sum of the amount of aromatic urea groups and the amount of urethane groups is 2700 to 5000 mmol per kg polyurethane urea polymer.

Adhesives based on these polymers may be used at room temperature but not as contact adhesives because mechanical fixation is required during curing of the adhesive. Furthermore, photolytic aging leads to yellowing, for example due to UV or fluorescent light.

Polychloropren dispersions such as Dispercoll® C (Bayer MaterialScience) are frequently employed as cold contact adhesives. Their advantage is that prior to joining water does not need to be evaporated and that they can be used in a wet-in-wet process. Disadvantages are that they tend to yellow under light exposure and have a low performance on soft PVC grades.

The present invention therefore has the object of providing an aqueous polyurethane dispersion which is suitable for use as cold contact adhesives, which do not show yellowing under prolonged UV light exposure and can also be used on substrates such as soft PVC.

This object is achieved in the present invention by an aqueous dispersion comprising at least one polyurethane polymer with a melting temperature in the range of 30° C. to 50° C. as determined by differential scanning calorimetry according to DIN 65467 at a heating rate of 20 K/min, the polyurethane polymer being obtainable from a reaction mixture comprising:

AI) at least one polyester polyol with a number average molecular weight in the range of 400 g/mol to 5000 g/mol and a melting temperature in the range of 40° C. to 80° C. as determined by differential scanning calorimetry according to DIN 65467 at a heating rate of 20 K/min;

AII) at least one polyester polyol with a number average molecular weight in the range of 400 g/mol to 5000 g/mol and a melting temperature in the range of 5° C. to 35° C. as determined by differential scanning calorimetry according to DIN 65467 at a heating rate of 20 K/min;

B) optionally, at least one difunctional polyol component;

C) at least one aliphatic diisocyanate; and

D) at least one aminic chain extender comprising at least one ionic or potentially ionic group;

wherein the molar ratio AI):AII) is in the range of 7:3 to 3:7.

It has surprisingly been found that such polyurethane dispersions are suitable as cold contact adhesives in wet-in-wet processes and coagulation processes and resist yellowing under prolonged light exposure. Preferably these adhesives do not show yellowing under UV light exposure after 300 days, more preferred 600 days and especially preferred 900 days.

The solids content of the dispersions (DIN EN ISO 3251) may be in a range of 20 weight-% to 70 weight-%, preferably from 30 weight-% to 65 weight-% and more preferred from 32 weight-% to 62 weight-%.

In the context of the present invention the term "polyurethane polymer" is understood to also include polyurethane-polyurea polymers.

The polyester polyols AI) and AII) may be obtained by the polycondensation of dicarboxylic acids with polyols. These polyols preferably have a molecular weight of 62 g/mol to 399 g/mol, have 2 to 12 C atoms, are branched or unbranched, are difunctional and have primary or secondary OH groups.

Preferably the polyester polyols AI) are crystalline and aliphatic. Suitable polyester polyols AI) include such polyols that are based on linear dicarboxylic acids and/or their derivatives such as anhydrides, esters or acid chlorides and aliphatic or cycloaliphatic, linear or branched polyols. Suitable dicarboxylic acids include adipic acid, succinic acid, sebacic acid and dodecane dicarboxylic acid. Adipic acid is preferred. These acids are used in an amount of at least 90 mol-%, preferably 95 mol-% to 100 mol-% with respect to the total amount of all carboxylic acids. If desired, other aliphatic, cycloaliphatic or aromatic dicarboxylic acids can also be employed. Examples for such acids include glutaric acid, azelaic acid, 1,4- 1,3- or 1,2-cyclohexane-dicarboxylic acid, terephthalic acid or isophthalic acid. These are employed in a total amount of not more than 5 mol-%, preferably 0 mol-% to 5 mol-%, with respect to the total amount of the carboxylic acids.

Preferred polyol components for the polyester polyols AI) are monoethylene glycol, 1,2-propanediol, 1,3-propanediol, 1,4-butanediol, neopentyl glycol or 1,6-hexanediol. Preferred are 1,6-hexanediol and 1,4-butanediol, particularly preferred 1,4-butanediol. The polyester polyols AI) may be obtained from one or more polyols; preferred is just from one polyol.

The number average molecular weight $M_n$, of the polyester polyols AI) is preferably in a range of 400 g/mol to 4000 g/mol, particularly preferred 1000 g/mol to 3000 g/mol, more particularly preferred 1500 g/mol to 2500 g/mol and most particularly preferred 1800 g/mol to 2400 g/mol.

Preferably the polyester polyols AII) are crystalline and aliphatic. Suitable crystalline or semicrystalline polyester polyols AII) include such polyols that are based on linear dicarboxylic acids and/or their derivatives such as anhydrides, esters or acid chlorides and aliphatic or cycloaliphatic, linear or branched polyols. Suitable dicarboxylic acids include adipic acid, succinic acid, sebacic acid and dodecane dicarboxylic acid. Adipic acid is preferred. These acids are used in an amount of at least 90 mol-%, preferably 95 mol-% to 100 mol-% with respect to the total amount of all carboxylic acids. If desired, other aliphatic, cycloaliphatic or aromatic dicarboxylic acids can also be employed. Examples for such acids include glutaric acid, azelaic acid, 1,4- 1,3- or 1,2-cyclohexanedicarboxylic acid, terephthalic acid or isophthalic acid. These are employed in a total amount of not more than 5 mol-%, preferably 0 mol-% to 5 mol-%, with respect to the total amount of the carboxylic acids.

Generally speaking, the same polyol components as for polyester polyol AI) are also suitable for AII). For AII) mixtures of at least two polyols are preferred. Particularly preferred are mixtures of 1,4-butanediol and neopentyl glycol, also of 1,6-hexanediol and neopentyl glycol. The latter mixtures are most preferred. If a mixture of polyols is to be used, the main components preferably constitute at least 20 mol-% each, preferably at least 30 mol-% each and more preferred at least 40 mol-% each of the total amount of the polyols employed.

The number average molecular weight $M_n$ of the polyester polyols AII) is preferably in a range of 400 g/mol to 4000 g/mol, particularly preferred 1000 g/mol to 3000 g/mol, more particularly preferred 1500 g/mol to 2300 g/mol and most particularly preferred 1500 g/mol to 1900 g/mol.

Examples for the optional at least one difunctional polyol component B) which is understood to be distinct from AI) and AII) include ethane-1,2-diol, propane-1,2-diol, propane-1,3-diol, butane-1,2-diol, butane-1,3-diol, butane-1,4-diol, butene-1,4-diol, butyne-1,4-diol, pentane-1,5-diol and its positional isomers, hexane-1,6-diol, octane-1,8-diol, 1,4-bishydroxymethylcyclohexane, 2,2-bis(4-hydroxycyclohexy) propane, 2-methyl-1,3-propanediol, glycerol, trimethylolpropane, trimethylolethane, hexane-1,2,6-triol, butane-1,2,4-triol, diethylene glycol, triethylene glycol, tetraethylene glycol, low molecular mass polyethylene glycol, poly-1,2-propylene glycol, poly-1,3-propanediol or poly THF, and also polyhydric alcohols such as trimethylolbutane, trimethylolpropane, trimethylolethane, neopentyl glycol, neopentyl glycol hydroxypivalate, pentaerythritol, 2-ethyl-1,3-propanediol, 2-methyl-1,3-propanediol, 2-ethyl-1,3-hexanediol, glycerol, ditrimethylolpropane, dipentaerythritol, hydroquinone, bisphenol A, bisphenol F, bisphenol B, bisphenol S, 2,2-bis(4-hydroxy-cyclohexyl) propane, 1,1-, 1,2-, 1,3-, and 1,4-cyclohexanedimethanol, 1,2-, 1,3- or 1,4-cyclohexanediol or sugar alcohols such as sorbitol, mannitol, diglycerol, threitol, erythritol, adonitol (ribitol), arabitol (lyxitol), xylitol, dulcitol (galactitol), maltitol or isomalt. Preference is given to using linear 1,ω-dihydroxyalkanes, more preferably butane-1,4-diol and hexane-1,6-diol.

Aliphatic diisocyanates C) are preferably isocyanates having 4 to 20 carbon atoms. Examples of typical diisocyanates are aliphatic diisocyanates such as tetramethylene diisocyanate, pentamethylene 1,5-diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate (e.g. lysine methyl ester diisocyanate, lysine ethyl ester diisocyanate), trimethyihexane diisocyanate or tetramethylhexane diisocyanate, cycloaliphatic diisocyanates such as 1,4-, 1,3- or 1,2-diisocyanatocyclohexane, 4,4'- or 2,4'-di-(isocyanatocyclohexyl)methane, 1-isocyanato-3,3,5-trimethyl-5-(isocyanatomethyl)-cyclohexane (isophorone diisocyanate), 1,3- or 1,4-bis (isocyanatomethyl)cyclohexane or 2,4-, or 2,6-diisocyanate-1-methylcyclohexane, and also 3 (or 4), 8 (or 9)-bis-(isocyanatomethyl)-tricyclo [5.2.1.0$^{2,6}$]decane isomer mixtures.

Suitable aminic chain extenders D) are diamines and monoamines as well as their mixtures. In the context of the present invention the term "chain extender" also includes monoamines which lead to chain termination.

Examples for monoamines include aliphatic and/or alicyclic primary and/or secondary monoamines such as ethylamine, diethylamine, the isomeric propyl- and butylamines, higher linear aliphatic monoamines and cycloaliphatic monoamines such as cyclohexylamine. Other examples include aminoalcohols, i.e. compounds with an amino and a hydroxy group in one molecule such as ethanolamine, N-methylethanolamine, diethanolamine or 2-propanolamine. Mention is also made of monoamino compounds which also comprise sulfonic acid and/or carboxylic acid groups such as taurine, glycine or alanine.

Examples for diamino compounds include 1,2-ethanediamine, 1,6-hexamethylenediamine, 1-amino-3,3,5-trimethyl-5-aminomethyl-cyclohexane (isophoronediamine), piperazine, 1,4-diaminocyclohexane or bis-(4-aminocyclohexyl)-methane. Also suitable are adipic acid dihydrazide, hydrazine or hydrazine hydrate. Polyamines such as diethylenetriamine may also be used instead of a diamino compound.

Further examples include diaminoalcohols such as 1,3-diamino-2-propanol, N-(2-hydroxyethyl)-ethylenediamine or N,N-bis(2-ydroxyethyl)-ethylenediamine.

Examples for diamino compounds with an ionic or potentially ionic group, in particular with sulfonate and/or carboxylate groups, include the sodium or potassium salts of N-(2-aminoethyl)-2-aminoethanesulfonic acid, N-(2-aminoethyl)-2-aminoethanecarboxylic acid, N-(3-aminopropyl)-2-aminoethanesulfonic acid, N-(3-aminopropy)-2-aminoethanecarboxylic acid, N-(3-aminopropyl)-3- aminopropanesulfonic acid, N-(3-aminopropyl)-3-aminopropanecarboxylic acid, N-(2-aminopropyl)-3-aminopropanesulfonic acid and N-(2-aminopropyl)-3-aminopropanecarboxylic acid. Preferred are the sodium salts of N-(2-aminoethyl)-2-aminoethanesulfonic acid and N-(2-aminoethyl)-2-aminoethanecarboxylic acid, the former being particularly preferred.

All the processes known from the prior art can be used for the preparation of the dispersions according to the invention, such as the emulsifier/shear force, acetone, prepolymer mixing, melt emulsification, ketimine and solids spontaneous dispersion processes or derivatives thereof. A summary of these methods is to be found in Methoden der organischen Chemie (Houben-Weyl, Erweiterungs- und Folgebände zur 4. Auflage, Volume E20, H. Bartl and J. Falbe, Stuttgart, N.Y., Thieme 1987, p. 1671-1682). The melt emulsification and the acetone process are preferred. The acetone process is particularly preferred. In this context, reference is made to DE 1570 602 A1, DE 1570 615 A1 and DE 1694 062 A1.

Particular embodiments and other aspects of the present invention will be described below. The embodiments may be combined freely unless the context clearly indicates otherwise.

In one embodiment of the dispersion according to the invention the polyurethane polymer has a glass transition temperature in the range of −60° C. to −10° C. as determined by differential scanning calorimetry according to DIN 65467 at a heating rate of 20 K/min. Preferably the glass transition temperature is in the range of −50° C. to −20° C.

In another embodiment of the dispersion according to the invention the polyurethane polymer has a melting temperature in the range of 30° C. to 50° C. as determined by differential scanning calorimetry according to DIN 65467 at a heating rate of 20 K/min. Preferably the melting temperature is in a range of 40° C. to 45° C.

In another embodiment of the dispersion according to the invention the polyester polyol AI) has a melting temperature in the range of 40° C. to 60° C. as determined by differential scanning calorimetry according to DIN 65467 at a heating rate of 20 K/min Preferable the melting temperature is in a range of 45° C. to 55° C.

In another embodiment of the dispersion according to the invention the polyester polyol AII) has a melting temperature in the range of 15° C. to 30° C. as determined by differential scanning calorimetry according to DIN 65467 at a heating rate of 20 K/min. Preferable the melting temperature is in a range of 20° C. to 28° C.

In another embodiment of the dispersion according to the invention the molar ratio AI):AII) is in the range of 6:4 to 4:6. Preferably the molar ratio is in the range of 1,1:1 to 1:1,1.

In another embodiment of the dispersion according to the invention the polyester polyol AI) has an enthalpy of fusion in the range of 65 J/g to 90 J/g as determined by differential scanning calorimetry according to DIN 65467 at a heating rate of 20 K/min. Preferable the enthalpy of fusion is in the range of 75 J/g to 85 J/g.

In another embodiment of the dispersion according to the invention the polyester polyol AII) has an enthalpy of fusion in the range of 30 J/g to 70 J/g as determined by differential scanning calorimetry according to DIN 65467 at a heating rate of 20 K/min. Preferably the enthalpy of fusion is in a range of 40 J/g to 60 J/g.

In another embodiment of the dispersion according to the invention the polyester polyols AI) and AII) are aliphatic.

In another embodiment of the dispersion according to the invention the polyester polyol AI) is obtainable from a reaction mixture comprising adipic acid and 1,4-butanediol or 1,6-hexanediol. Polyesterpolyols AI) that are particularly preferred are polyesters based on adipic acid and 1,4-butanediol.

In another embodiment of the dispersion according to the invention the polyester polyol AII) is obtainable from a reaction mixture comprising adipic acid, 1,6-hexanediol and neopentyl glycol or from a reaction mixture comprising adipic acid, 1,4-butanediol and neopentyl glycol. The former mixture is particularly preferred.

In another embodiment of the dispersion according to the invention the aliphatic diisocyanate C) comprises hexamethylene 1,6-diisocyanate, 1,3- and/or 1,4-bis(isocyanato-methy)cyclohexane, isophorone diisocyanate and/or 4,4'- or 2,4'-di(isocyanato-cyclohexyl)methane.

In another embodiment of the dispersion according to the invention the aminic chain extender D) comprises a mixture of the sodium salt of N-(2-aminoethyl)-2-aminoethanesulfonic acid and diethanolamine or comprises a mixture of the sodium salt of N-(2-aminoethyl)-2-aminoethanesulfonic acid, diethanolamine and N-(2-hydroxyethyl)-ethylenediamine.

The dispersions according to the invention can be used alone or with binders, auxiliary substances and additives known in coating and adhesives technology, in particular emulsifiers and light stabilizers such as UV absorbers and sterically hindered amines (HALS), also antioxidants, fillers and auxiliary agents, for example antisettling agents, defoaming and/or wetting agents, flow control agents, reactive thinners, plasticizers, neutralizing agents, catalysts, auxiliary solvents and/or thickeners, and additives such as for example pigments, dyes or matting agents. Tackifiers can also be added.

The additives can be added to the product according to the invention immediately before processing. It is also possible, however, to add at least part of the additives before or during dispersion of the prepolymer.

The selection and amounts to be used of these substances, which can be added to the individual components and/or to the complete mixture, are known in principle to the person skilled in the art and can be determined by means of simple preliminary experiments tailored to the specific application without undue expense.

In accordance with the foregoing, another aspect of the invention is an adhesive comprising at least a dispersion according to the present invention. In one embodiment, the adhesive is a cold contact adhesive. A cold contact adhesive in the context of the present invention is to be understood as an adhesive that can be used in contact bonding processes without additional heating.

The solids content of the adhesives (DIN EN ISO 3251) may be in a range of 20 weight-% to 70 weight-%, preferably from 30 weight-% to 65 weight-% and more preferred from 32 weight-% to 62 weight-%.

It is also possible that the adhesive according to the present invention further comprises a polyisocyanate compound. This polyisocyanate then acts as a cross-linker. The cross-linkers can be added prior to use (2K processing). In this case, preference is given to polyisocyanate compounds which are emulsifiable in water. These are, for example, the compounds described in EP 0 206 059 A1, DE 31 12 117 A1 or DE 100 24 624 A1. The polyisocyanate compounds are used in an amount of from 0.1 weight-% to 20 weight-%, preferably from 0.5 weight-% to 10 weight-%, particularly preferably from 1.5 weight-% to 6 weight-%, based on the aqueous dispersion.

The adhesive compositions according to the present invention are also suitable for wet-in-wet processes using coagulants such as CaCl$_2$ salt solutions. With respect to wet-in-wet processes, a spray-mix method and a two-way method are expressly contemplated. Porous or water vapor-permeable substrates such as textiles, leather, fleeces or foams may be bonded without prior drying. Alternatively, the adhesive composition according to the present invention can also be used in heat activation processes.

The adhesive compositions according to the invention are suitable for bonding a wide variety of substrates, such as, for example, paper, cardboard, wood, textiles, metal, leather or mineral materials. The adhesive compositions according to the invention are suitable in particular for the bonding of rubber materials, such as, for example, natural and synthetic rubbers, various plastics materials such as polyurethanes, polyvinyl acetate, polyvinyl chloride, in particular plasticized polyvinyl chloride. They are particularly preferably used for bonding soles made of these materials, preferably based on polyvinyl chloride, particularly preferably plasticized polyvinyl chloride, or based on polyethylvinyl acetate or polyurethane elastomeric foam, to shoe shafts of leather or synthetic leather. The adhesive compositions according to the invention are also particularly suitable for bonding films based on polyvinyl chloride or plasticized polyvinyl chloride to wood.

The adhesive compositions according to the invention are also suitable for use as primers.

The present application also provides adhesive composites containing substrates adhesively bonded using the dispersions according to the invention.

The adhesive compositions according to the invention are processed by the known methods of adhesives technology in respect of the processing of aqueous dispersion adhesives.

The present invention will be further described with reference to the following examples without wishing to be limited by them.

EXAMPLES

Methods

Glass transition temperatures were determined according to DIN 65467 using a Perkin Elmer DSC-7 device which was calibrated using the melting onset of indium and lead. In each case 10 mg of the solid material were measured in the temperature range from −100° C. to +150° C. The heating rate was 20 K/min A total of three heating cycles were run. In the DSC diagram (DIN 51005) the glass transition temperature was evaluated using the tangent method (method A in DIN 65467). The temperature at half the height of the glass transition in the third heating run was used. The melting temperature of the polymers corresponds to the peak temperature (temperature at the curve's maximum) and the enthalpy of fusion (melting enthalpy) to the integral between the curve and the baseline. In case the crystallization is so slow that the crystallization does not commence at a cooling rate of 20 K/min then the corresponding data from the first heating run is used.

The solids content of the dispersions was determined according to DIN EN ISO 3251 and the number average molecular weight $M_n$ was calculated based on end group analysis (OH numbers according to DIN 53240).

Bond strengths and peel strength in the application testing were determined according to DIN EN 1392.

Materials

Polyester Polyol 1

This polyester polyol corresponds to AI) in the context of the present invention. It can be described as a partially crystalline, difunctional polyester polyol based on adipic acid and 1,4-butanediol with a number average molecular weight $M_n$ of 2250 g/mol (OH number 50 mg KOH/g). The glass transition temperature was −61° C., the melting temperature 49° C. and the enthalpy of fusion 80 J/g.

Polyester Polyol 2

This polyester polyol corresponds to AII) in the context of the present invention. It can be described as a partially crystalline, difunctional polyester polyol based on adipic acid, 1,6-hexanediol and neopentyl glycol (molar ratio of 1,6-hexanediol to neopentyl glycol=3:2) with a number average molecular weight $M_n$ of 1700 g/mol (OH number 66 mg KOH/g). The glass transition temperature was −63° C., the melting temperature 26° C. and the enthalpy of fusion 55 J/g.

Example 1

According to the Invention

A mixture of 196 g polyester polyol 1 (0.087 mol) and 148 g polyester polyol 2 (0.087 mol) was dried for 1 hour at 100° C. and 15 mbar pressure. 6.62 g 1.4 butanediol followed by 77.1 g isophorone diisocyanate (IPDI) were then added at 60° C. The mixture was stirred at 90° C. until a constant isocyanate content of 1.89% was reached. After cooling to 60° C. the mixture was stirred for another 20 minutes and then dissolved in 642 g acetone under cooling to 50° C. Into the homogenous solution a solution of 7.79 g Na-Diaminosulfonate (H$_2$N—CH$_2$—CH$_2$—NH—CH$_2$—CH$_2$—SO$_3$Na) and 3.79 g diethanolamine in 100 g water was added under vigorous stirring. After 15 minutes a dispersion was prepared by the addition of 715 g water. Removal of the acetone by distillation resulted in a solvent-free aqueous polyurethane-polyurea dispersion with a solids content of 35.1 weight-%.

The glass transition temperature of the dried dispersion was −41° C., the melting temperature 43° C. and the enthalpy of fusion 25 J/g.

Application Example 2

An adhesive based on the dispersion of example 1 was tested as-two component cold contact adhesive with additionally 3 weight-% of a hydrophilic aliphatic polyisocyanate based on HDI (Desmodur® DN, Bayer MaterialScience) on various substrates. Samples were dried at 23° C. for one hour and bonded for 30 seconds at 4 bar pressure. The results are summarized below.

| Substrate | Initial bond strength [N/mm] | Final bond strength [N/mm] |
|---|---|---|
| Soft-PVC (30% plasticizer) | 1.3 | 5.0 |
| Soft-PVC/Satra-Leather | 2.4 | 4.1 |
| Soft-PVC/Canvas | 2.1 | 3.9 |
| SBR-Rubber | 1.2 | 7.5 |
| SBR-Rubber/Satra-Leather | 1.9 | 5.5 |

Example 3

Adhesives based on the dispersion of example 1 and, in the two-component case, additionally 3 weight-% of a hydrophilic aliphatic polyisocyanate based on HDI (Desmodur® DN, Bayer MaterialScience) were tested in one- and two-component heat activation bonding. The results are summarized below.

| Substrate | Initial peel strength [N/mm] | Final peel strength [N/mm] |
|---|---|---|
| One-component adhesive | | |
| Soft-PVC (30% plasticizer) | 3.9 | 8.3 |
| Two-component adhesive | | |
| Soft-PVC (30% plasticizer) | 2.6 | 7.8 |

Example 4

Adhesives based on the dispersion of example 1 and, in the two-component case, additionally 3 weight-% of a hydrophilic aliphatic polyisocyanate based on HDI (Desmodur® DN, Bayer MaterialScience) were tested in one- and two-component heat activation bonding. The results are summarized below.

| Substrate | Initial peel strength [N/mm] | Final peel strength [N/mm] |
|---|---|---|
| One-component adhesive | | |
| Hard PVC/Beechwood | 1.0 | 4.5 |
| Two-component adhesive | | |
| Hard PVC/Beechwood | 0.4 | 4.1 |

The invention claimed is:

1. An aqueous dispersion comprising at least one polyurethane polymer with a melting temperature in the range of 30° C. to 50° C. as determined by differential scanning calorimetry according to DIN 65467 at a heating rate of 20 K/min, the polyurethane polymer being obtained from a reaction mixture comprising:
   AI) at least one polyester polyol with a number average molecular weight in the range of 400 g/mol to 5000 g/mol and a melting temperature in the range of 40° C. to 80° C. as determined by differential scanning calorimetry according to DIN 65467 at a heating rate of 20 K/min;
   AII) at least one polyester polyol with a number average molecular weight in the range of 400 g/mol to 5000 g/mol and a melting temperature in the range of 5° C. to 35° C. as determined by differential scanning calorimetry according to DIN 65467 at a heating rate of 20 K/min;
   B) optionally, at least one difunctional polyol component;
   C) at least one aliphatic diisocyanate; and
   D) at least one aminic chain extender comprising at least one ionic or potentially ionic group;
wherein
the molar ratio AI):AII) is in the range of 7:3 to 3:7.

2. The dispersion according to claim 1, wherein the polyurethane polymer has a glass transition temperature in the range of −60° C. to −10° C. as determined by differential scanning calorimetry according to DIN 65467 at a heating rate of 20 K/min.

3. The dispersion according to claim 1, wherein the polyester polyol AI) has a melting temperature in the range of 40° C. to 60° C. as determined by differential scanning calorimetry according to DIN 65467 at a heating rate of 20 K/min.

4. The dispersion according to claim 1, wherein the polyester polyol AII) has a melting temperature in the range of 15° C. to 30° C. as determined by differential scanning calorimetry according to DIN 65467 at a heating rate of 20 K/min.

5. The dispersion according to claim 1, wherein the molar ratio AI):AII) is in the range of 6:4 to 4:6.

6. The dispersion according to claim 1, wherein the polyester polyol AI) has an enthalpy of fusion in the range of 65 J/g to 90 J/g as determined by differential scanning calorimetry according to DIN 65467 at a heating rate of 20 K/min.

7. The dispersion according to claim 1, wherein the polyester polyol AII) has an enthalpy of fusion in the range of 30 J/g to 70 J/g as determined by differential scanning calorimetry according to DIN 65467 at a heating rate of 20 K/min.

8. The dispersion according to claim 1, wherein the polyester polyols AI) and AII) are aliphatic.

9. The dispersion according to claim 1, wherein the polyester polyol AI) is obtained from a reaction mixture comprising adipic acid and 1,4-butanediol or 1,6-hexanediol.

10. The dispersion according to claim 1, wherein the polyester polyol AII) is obtained from a reaction mixture comprising adipic acid, 1,6-hexanediol and neopentyl glycol or from a reaction mixture comprising adipic acid, 1,4-butanediol and neopentyl glycol.

11. The dispersion according to claim 1, wherein the aliphatic diisocyanate C) is selected from the group consisting of hexamethylene 1,6-diisocyanate, 1,3-bis(isocyanato-methyl)cyclohexane, 1,4-bis(isocyanato-methyl)cyclohexane, isophorone diisocyanate, 4,4'-diasocyanato-cyclohexyl)methane, 2,4'-di(isocyanato-cyclohexyl)methane, and mixtures thereof.

12. The dispersion according to claim 1, wherein the aminic chain extender D) comprises a mixture of the sodium salt of N-(2-aminoethyl)-2-aminoethanesulfonic acid and diethanolamine or comprises a mixture of the sodium salt of N-(2-aminoethyl)-2-aminoethanesulfonic acid, diethanolamine and N-(2-hydroxyethyl)-ethylenediamine.

13. An adhesive comprising at least the dispersion according to claim 1.

14. The adhesive according to claim 13, wherein the adhesive is a cold contact adhesive.

15. A method comprising utilizing the dispersion according to claim 1 for bonding of rubber materials selected from the group consisting of natural and synthetic rubbers, polyurethanes, polyvinyl acetate, and polyvinyl chloride.

16. A method comprising utilizing the dispersion according to claim 1 for bonding porous or water vapor-permeable substrates by wet-in-wet processes.

* * * * *